(12) United States Patent
Kageyama (10) Patent No.: US 6,324,462 B1
(45) Date of Patent: Nov. 27, 2001

(54) SPEED CONTROLLER FOR A SELF-TRAVELING VEHICLE

(75) Inventor: Masato Kageyama, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/138,635

(22) Filed: Aug. 24, 1998

(30) Foreign Application Priority Data

Aug. 22, 1997 (JP) ................................................... 9-240257

(51) Int. Cl.[7] .................................................. G05D 1/02
(52) U.S. Cl. ........................... 701/93; 701/200; 701/301; 318/580; 318/587; 180/167; 901/1; 901/49
(58) Field of Search ................................. 701/93, 41, 70, 701/301; 340/903; 382/104

(56) References Cited

U.S. PATENT DOCUMENTS

| | | | |
|---|---|---|---|
| 4,802,096 | * | 1/1989 | Hainsworth et al. ................. 364/461 |
| 5,416,713 | * | 5/1995 | Kameda et al. ...................... 364/461 |
| 5,646,612 | * | 7/1997 | Byon ................................... 340/903 |
| 5,878,362 | * | 3/1999 | Sekine et al. .......................... 701/41 |
| 5,936,549 | * | 8/1999 | Tsuchiya ............................. 340/903 |
| 5,948,035 | * | 9/1999 | Tomita ................................... 701/70 |
| 5,952,939 | * | 9/1999 | Nakazawa ........................... 340/903 |
| 5,959,552 | * | 9/1999 | Cho ..................................... 340/903 |
| 5,983,161 | * | 11/1999 | Lemelson et al. ................... 701/301 |
| 5,999,092 | * | 12/1999 | Smith et al. ......................... 340/436 |
| 6,031,484 | * | 2/2000 | Bullinger et al. ...................... 342/72 |
| 6,035,053 | * | 3/2000 | Yoshioka et al. ................... 382/104 |
| 6,044,321 | * | 3/2000 | Nakamura et al. ................... 701/96 |

* cited by examiner

Primary Examiner—William A. Cuchlinski, Jr.
Assistant Examiner—Tuan C To
(74) Attorney, Agent, or Firm—Sidely Austin Brown & Wood (57) ABSTRACT

A speed controller for a self-traveling vehicle, capable of traveling at high speed along curves, downhill roads, and uphill roads without colliding with an object detected by an object detecting means, is provided. Therefore, a speed controller, equipped in the self-traveling vehicle, previously stores a detection limit area A, of an object detecting means 1, and speed at the start of braking Vmax of every braking stop distance La, receives information on detection distance L from the object detecting means 1; information on a predetermined course Co from a course storage means 2; and information on a current position Po from a current position defining means 3, limits the detection distance L from the object detecting means 1 by the detection limit area A from the current position Po and the predetermined course Co from the current position Po; computes the speed at the start of braking Vmax with a limited detection distance Ln as the breaking stop distance La; and controls actual speed Va by operating a speed control actuator 4 to make the speed at the start of braking Vmax the upper limit.

10 Claims, 5 Drawing Sheets

SPEED CONTROLLER FOR A SELF-TRAVELING VEHICLE

FIELD OF THE INVENTION

The present invention relates to a speed controller for a self-traveling vehicle.

BACKGROUND OF THE INVENTION

Some self-traveling vehicles include an object detecting means for detecting an object in the traveling direction of the vehicle and the distance from the vehicle to the object, and a speed control actuator. Others further include a course storage means for storing a predetermined course in a coordinate system and a current position defining means for receiving coordinate information on the predetermined course from the course storage means and defining a current position of a vehicle on the predetermined course.

The object detecting means transmits a directional medium, such as light, a millimeter wave, or an ultrasonic wave, in the traveling direction of a vehicle. A reflected wave from an object is received and the transmitted and received waves are processed to detect the object. Also, various means of determining a distance to the object and relative velocity with respect to the object are known. In a millimeter-wave method, for example, a signal wave (usually a chopping wave) together with a millimeter wave is transmitted from a transmitting antenna in the traveling direction of a vehicle. A reflected wave from the object is received by a receiving antenna, and the transmitted and received waves are processed by a pulse method, a two frequency CW method, a FM-CW method or the like. In addition, a method in which more than one object is detected at the same time as well as each distance and the relative speed of each object, by means of a frequency analysis method such as a filter bank or a fast Fourier transform (FFT) is known. Incidentally, objects to be detected are usually other vehicles traveling ahead of the vehicle in the traveling direction which can be obstacles to the vehicle. However, if a directional medium is transmitted without limits, objects such as road surfaces, telegraph poles on road shoulders, guardrails, various kinds of road signs, buildings beyond curves, or steep cliffs are detected. To prevent these undesired detections, in a millimeter-wave system, for example, the area of an antenna, the antenna height, the antenna angle (which is the illuminating angle), the output intensity of the millimeter wave, the frequency of the millimeter wave, the signal wave, and the like are adjusted so that a forward detection limit is set for about 150 meters, for example, and a detection limit in vertical and lateral directions will be set for about four meters (corresponding to the width of one road lane), for example. Thus, for example, devices are provided which do not detect objects outside a straight course of travel and do not mistake a road surface for a detected object by regarding a reflected wave from the road surface itself as noise or ground clutter, and the like. In a situation wherein an object is on an uphill road, a wave is reflected from the uphill road or the object and is received. However, the reflection intensity from the uphill road is usually larger than the reflection intensity from a flat road (corresponding to the aforementioned noise or ground clutter), but smaller than reflection intensity from the object on the uphill road. In addition, if a graph is constructed with a vertical axis indicating the reflected wave intensity and a horizontal axis indicating distance, the reflection intensity from the uphill road continuously increases as the distance increases. Conversely, in the case of a flat road, the reflection intensity becomes smaller as the distance increases. Therefore, the presence or absence of an uphill road, or art object on the uphill road, is discriminated.

The speed control actuator consists of a means to control the vehicle speed, such as an accelerator, a brake or the like. In a manually operated vehicle, the speed control actuator is operated by an operator. In an unmanned vehicle traveling on a predetermined course, a speed control program, corresponding to the predetermined course, is stored in advance, and the speed control actuator is automatically controlled in accordance with the speed control program.

The course storage means is a memory for storing a shape of a predetermined course in a coordinate system for a vehicle traveling on a predetermined course (an unmanned vehicle, for example). Storage information, such as the distance of each section, course width, curves, downhill roads, uphill roads, gradients, and the like, are outputted to be used in computations.

The current position defining means receives coordinate system information on the predetermined course from the course storage means and defines a current position of a vehicle on the predetermined course. For example, a gyro, an equipment disposed at every important position in the course for giving and receiving position information to/from a vehicle, GPS using an artificial satellite, or the like are used.

Incidentally, technology disclosed in Japanese Patent Laid-open No. 5-203746 can be embodied in a self-traveling vehicle including some of the aforementioned factors. This technology detects the distance between two vehicles and provides an alarm device for changing a detection area by laser beam according to a radius of curvature of a curve as detected by a steering sensor.

However, a detection limit of the object detecting means and an effective detection limit of a vehicle are different. In the case of curves or downhill roads, for example, the effective detection limit of the vehicle itself becomes shorter. Specifically, in a curve, the detection limit area of the object detecting means includes the area beyond the curve; however, the effective detection limit of the vehicle is up to the outer edge of the curve in the detection limit area. In such a case, the effective detection limit is shorter than the detection limit of the object detecting means. Moreover, on a downhill road in a traveling direction, other vehicles or the like cannot at time be detected, depending on the gradient of the downhill road, since they are located below a lower surface of the detection limit area. Also, in such a case, the effective detection limit is shorter than the detection limit of the object detecting means. In the above cases, if a vehicle travels at such a speed that the vehicle cannot stop within the effective detection limit, the vehicle will collide or interfere with another vehicle, even if the object detecting means applies the brakes to the vehicle immediately after detecting an obstacle. Technology wherein an effective detection limit is connected with vehicle speed, as described above, is not known in the art. The technology disclosed in the aforementioned Japanese Laid-open Patent No. 5-203746 is useful only for discriminating between obstacles outside a course of travel and obstacles inside the course of travel. Specifically, when vehicle speed is left to an operator, collision or interference can be prevented, but there is some risk of collision or interference due to inattention of the operator. On the other hand, in a self-traveling vehicle, which stores a speed control program corresponding to a predetermined course and travels on the predetermined course in accordance with the speed information defined in the speed control program, such as an unmanned dump truck working in mines, or the like, a vehicle speed capable of preventing collision or interference with a detected object in any condition is set and the vehicle travels on the predetermined course in accordance with the set speed. In this case, the set speed is slow, thereby securing safety but making it difficult to improve productivity.

SUMMARY OF THE INVENTION

An object of the present invention is a speed controller for a self-traveling vehicle which is capable of traveling at high speed without colliding with an object detected by an object detecting means, even on uphill roads, on curves, or on downhill roads.

To attain this object, a speed controller for a self-traveling vehicle according to the present invention includes an object detecting means for detecting an object in a vehicle's direction of travel and a distance to the object, a course storage means for storing a predetermined course in a coordinate system, a current position defining means for receiving coordinate information on the predetermined course from the course storage means and defining a current position of a vehicle on the predetermined course, and a speed control actuator, such as an accelerator or a brake. The speed controller is further characterized in that a detection limit area of the object detecting means and speed at the start of every braking stop are stored in advance; information on detection distance from the object detecting means, information on the predetermined course from the course storage means, and information on the current position from the current position defining means are received; the detection distance, from the object detecting means to the object, is limited by the detection limit area from the current position and the predetermined course from the current position; the speed at the start of braking is computed with the limited detection distance as the braking stop distance; and actual vehicle speed is controlled by operating the speed control actuator to make the speed at the start of braking the upper speed limit.

According to the aforementioned structure, the following operational effects can be obtained. First, the detection distance is limited by the object detecting means' own peculiar detection limit area and the shape of the predetermined course as seen from a current position of a vehicle. Specifically, the limited detection distance is detection distance as seen from the vehicle. Moreover, the speed at the start of braking is computed using the limited detection distance as braking stop distance. Here, the speed at the start of braking is set for the speed at which the vehicle can stop within the braking stop distance, when the vehicle is suddenly braked. The speed control actuator is operated to control actual speed so as to make the aforementioned speed at the start of braking the upper speed limit. Accordingly, a collision or interference between the vehicle and a detected object is prevented. In other words, the vehicle can travel at a speed at the start of braking, which is, the maximum speed which can prevent a collision or an interference. Thus, productivity as well as safety can be considerably and certainly improved.

Further, the aforementioned limited detection distance may be a distance between a nearest intersection point from the current position out of the intersection points of an outer edge of the detection limit area, as seen from above, and an outer edge of the predetermined course, as seen from above, and the current position.

According to the aforementioned structure, the following operational effects can be obtained. This structure applies to the operation performed when a curve exists ahead of a vehicle or a vehicle is located on a curve. Specifically, the distance to the nearest intersection point from a current position of intersection points on the outer edge of the detection limit area of the object detecting means and the outer edge of the curve is computed and the vehicle is made to travel at an actual speed below the speed at the start of braking corresponding to the above distance. Thus, the vehicle never travels beyond the curve. In other words, even when the vehicle travels at the speed required at the start of braking, the vehicle can travel at high speed without jumping over the curve.

Furthermore, a point where a height from a lower surface of the outer edge of the detection limit area, as seen from a cross direction, to an upper surface of the predetermined course, as seen from the cross direction, is a predetermined height is computed and the distance from the current position to the computed point may be the aforementioned limited detection distance.

According to the aforementioned structure, the following operational effects can be obtained. This structure applies to the operation performed when a starting point of a downhill road or an end point of an uphill road exists ahead of a vehicle. The predetermined height is nearly the height of an upper end of the rear surface of another vehicle, for example, which exists on a road surface ahead of the starting point of the downhill road or the end point of the uphill road. Specifically, the larger the gradient of the forward road surface, the more suddenly another vehicle traveling on the forward road at low speed or stopping is detected by the object detecting means. At this time, if the vehicle is traveling at high speed, there is a risk that the vehicle will collide or interfere with another vehicle even when the vehicle is immediately braked. In this structure, however, the use of the predetermined height makes it possible to secure an effective detection distance farther beyond the starting point of the downhill road or the end point of the uphill road by the predetermined height. The effective detection distance is the limited detection distance. Thus, the vehicle can travel at speed below fast speed, at the start of braking, without colliding or interfering with another vehicle on the road in front. It should be mentioned that the predetermined height may be a fixed height of a reflector, if the reflector is attached on the rear surface of another vehicle. In such a case, the higher the fixed height is, the faster the speed at which the start of braking can be made.

Moreover, a point where a height from an upper surface of the outer edge of the detection limit area, as seen from the cross direction, to an upper surface of the predetermined course, as seen from the cross direction, is a predetermined height is computed and a distance from the current position to the computed point may be the aforementioned limited detection distance.

According to the aforementioned structure, the following operational effects can be obtained. This structure applies to the operation performed when a starting point of an uphill road or an end point of a downhill road exists ahead of a vehicle. The predetermined height is nearly the height of a base of the body of another vehicle, for example, which exists on a road ahead of the starting point of the uphill road or the end point of the downhill road. When another vehicle on the uphill road is seen from a vehicle on the straight road, or another vehicle on a road ahead of the end point of the downhill road is seen from a vehicle on the downhill road, the detection distance becomes shorter depending on the height of the space between the uphill road and the body of another vehicle caused by fixing the tires. At this time, if the vehicle is traveling at high speed, there is a risk that the vehicle will collide or interfere with another vehicle even is the vehicle is immediately braked. In this structure, however, the use of the predetermined height makes it possible to secure an effective detection distance farther beyond the starting point of the uphill road or the end point of the downhill road by the predetermined height. The effective detection distance is the limited detection distance. Thus, the vehicle can travel at speed below fast speed at the start of braking without colliding or interfering with another vehicle existing on the road in front. It should be mentioned that the predetermined height may be a fixed height of a reflector, if the reflector is attached on the rear surface of another vehicle. In such a case, the lower the fixed height, the faster the speed at which the start of braking can be made.

In addition, when a self-traveling vehicle, equipped with the speed controller for the self-traveling vehicle described in any of the aforementioned embodiments of the present invention, stores a speed control program corresponding to a predetermined course, and travels on the predetermined course while being speed-controlled under the speed control program, the speed controller may update information on vehicle speed at each position on the predetermined course in the speed control program in order to make the speed at the start of braking, as computed by the speed controller the upper speed limit.

According to the aforementioned structure, the following operational effects can be obtained. The information on vehicle speed at each position on the predetermined course in the speed control program is updated with the speed information in which the speed at the start of braking, as computed by the speed controller is set for the upper speed limit, thereby enabling safer and higher productive operation. The aforementioned speed controller can be very suitably provided in an unmanned vehicle.

DETAILED DESCRIPTION OF THE INVENTION

Figure 1:
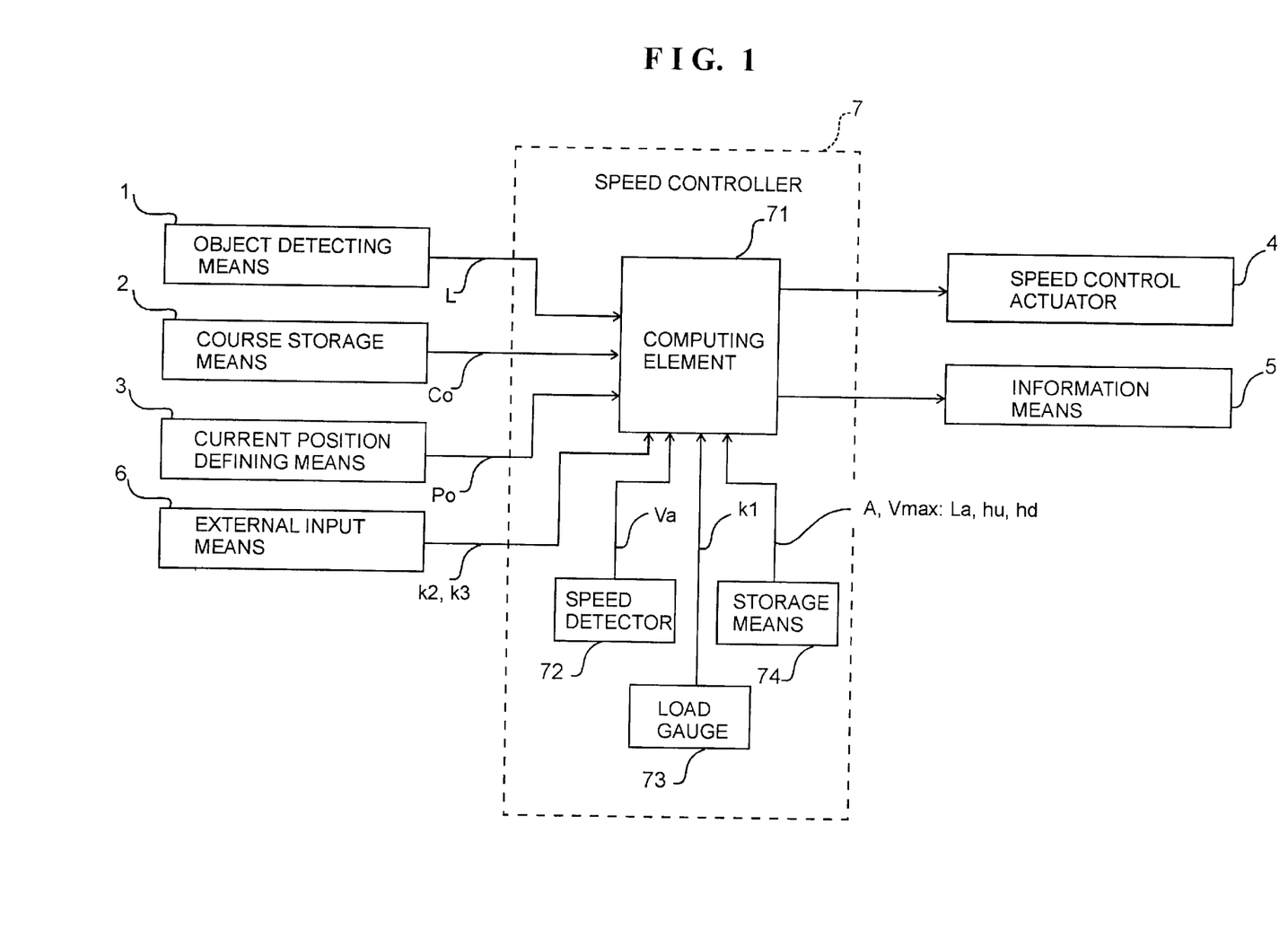
FIG. 1 is a block diagram of an embodiment of the present invention.

Preferred embodiments of the present invention will now be described in detail with reference to the aforementioned drawings. A vehicle equipped with an embodiment is a dump truck which travels over a predetermined course having uphill portions, downhill portions, and curves in mines, dam construction sites, or the like. Referring to FIG. 1, the vehicle includes an object detecting means 1, a course storage means 2, a current position defining means 3, a speed control actuator 4, an information means 5, an external input means 6, and a speed controller 7. The details of these elements are described hereinafter. It should be mentioned that the object detecting means 1, the course storage means 2, the current position defining means 3, and the speed control actuator 4 were described above. Therefore, repetition of the explanation thereof is omitted.

The speed controller 7 includes a computing element 71, a speed detector 72, electrically connected to the computing element 71; a load gauge 73; and a storage means 74. The object detecting means 1, the course storage means 2, the current position defining means 3, and the external input means 6 are electrically connected to the input side of the computing element 71, which receives information from each thereof. Incidentally, the current position defining means 3 defines a current position Po of the vehicle on a predetermined course co as described above. Therefore, as shown in FIG. 1, the current position defining means 3 receives information on the predetermined course Co from the course storage means 2. Meanwhile, the speed control actuator 4 and the information means 5 are electrically connected to the output side of the computing element 71, which inputs an operation signal to each thereof.

The speed detector 72 detects actual speed Va of the vehicle and inputs the same to the computing element 71.

The load gauge 73 detects the state of loads W on a load-carrying platform of the vehicle (unloaded, fully loaded, or partially loaded) and inputs the state as a correction factor k1 to the computing element 71. The load gauge 73 can be, for example, a pin with a force sensor which supports the internal pressure of a suspension cylinder or the load-carrying platform. Various other kinds of load gauges can be used in the present invention.

The storage means 74 stores a detection limit area A of the object detecting means 1, speed at the start of braking Vmax of every braking stop distance La (Vmax : La), predetermined heights hu and hd (described later in detail), and the like. The detection limit area A is set, for example, to about 150 meters in a forward direction and to about four meters in the vertical and lateral directions, as described above in relation to a millimeter-wave method. The braking stop distance La is the distance (10 meters, for example) which is added to the braking distance at the time of stopping the vehicle traveling at some actual speed Va by prompt braking. The speed at the start of braking Vmax is the same as the aforementioned some actual speed Va. The variables La and Vmax are stored as the function Vmax=f(La) or corresponding matrix Vmax: La in the storage means 74.

The external input means 6 is what an operator manually inputs as a correction factor k2 (described in detail later) relative to the braking stop distance La to the computing element 71, for example when coefficient of friction $\mu$ of a road surface of the predetermined course Co drastically changes due to external factors such as a rainfall or snowfall. Naturally, a rainfall meter, a snowfall meter, or the like may be equipped in the vehicle to automatically input the measured data as a correction factor k2 to the computing element 71. In this case, the rainfall meter, snowfall meter, or the like is the external input means 6.

The information means 5 is an indicator such as an alarm unit, a flashing light, CRT, or the like, and operates by receiving an operation command from the computing element 71.

The computing element 71 is, for example, a microcomputer and operates the speed control actuator 4 in accordance with an operation program illustrated in the following FIG. 2 so as to control the actual speed Va of the vehicle.

A step S1 is as follows. As described above, the computing element 71 stores the detection limit area A of the object detecting means 1, the speed at the start of braking Vmax of every braking stop distance La (Vmax La), and the predetermined heights hu and hd.

A step S2 is as follows. While the vehicle is traveling, the computing element 71 receives information on detection distance L from the object detecting means 1, information on the predetermined course Co from the course storage means 2, information on the current position Po of the vehicle on the predetermined course Co from the current position defining means 3, and information on the actual speed Va of the vehicle from the speed detector 72.

A step S3 is as follows. The computing element 71 recognizes the conjunction (namely, superposed shape AC) of the detection limit area A, as seen from the current position Po, and the predetermined course Co. The detection distance L from the object detecting means 1 is limited by the superposed shape AC. Limited examples in this case are shown in the following small steps S3A to S3D.

Figure 3:
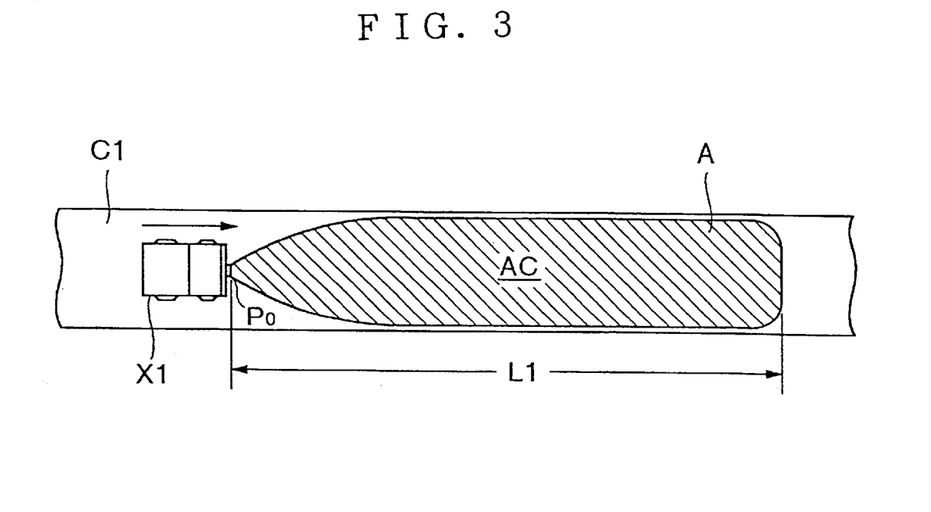
FIG. 3 is a plan view of a straight road and a vehicle traveling on the straight road, according to an embodiment of the present invention.
Figure 4:
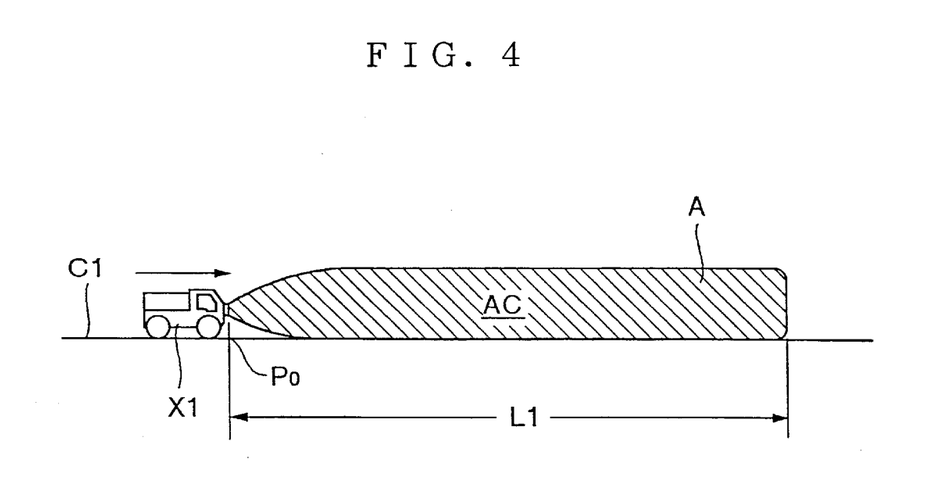
FIG. 4 is a side elevational view of the straight road and the vehicle shown in FIG. 3.

The small step S3A is as follows. As shown in FIG. 3 and FIG. 4, when a vehicle X1 is traveling on a straight road C1, the detection limit area A and the superposed shape AC are the same. Therefore, the detection distance L is not limited. Specifically, the farthest distance Lmax1, from the current position Po, within the detection distance L, is extracted. The distance Lmax1 will be expressed as distance L1 hereinafter. Naturally the distance L1 is also the longest distance (the aforementioned 150 meters) in a traveling direction, in the detection limit area A, of the object detecting means 1, stored by the storage means 74. Accordingly, the aforementioned farthest distance Lmax1 from the current position Po within the detection distance L from the object detecting means 1 can be also expressed as the longest distance Lmax1 in the detection limit area A.

Figure 5:
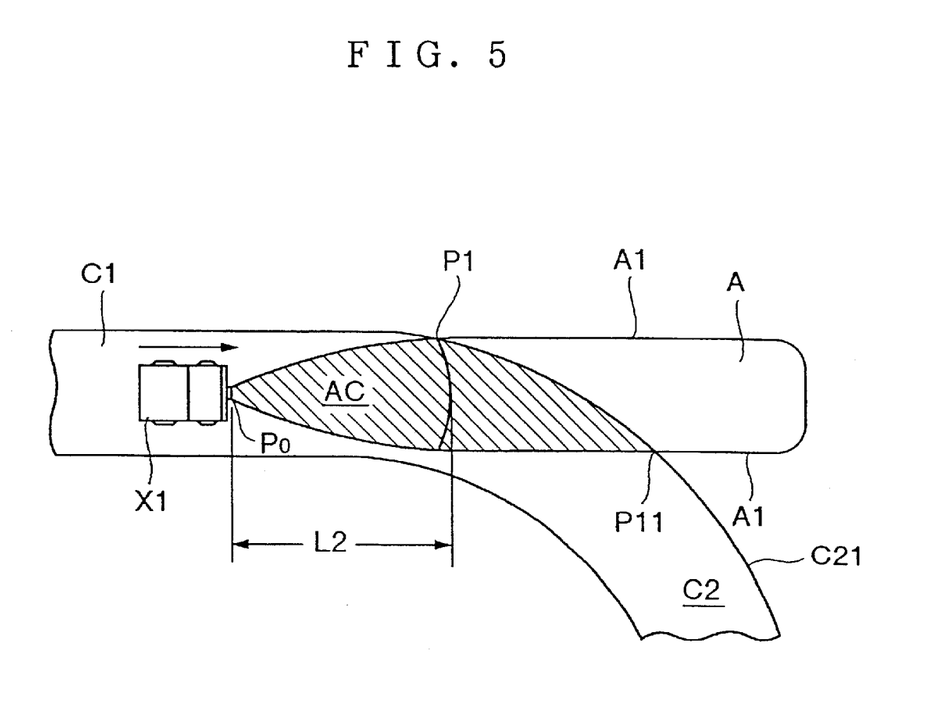
FIG. 5 is a plan view of a curve and a vehicle traveling on the curve, according to an embodiment of the present invention.

The small step S3B is as follows. As shown in FIG. 5, the vehicle X1 approaches a curve C2 from the straight road C1. At this time, the computing element 71 computes distance L2 to a nearest intersection point P1 from the current position Po, of intersection points P1 and P11, of an outer edge A1 of the detection limit area A, of the object detecting means 1, and an outer edge C21 of the curve C2, and limits the detection distance L by the distance L2.

Figure 6:
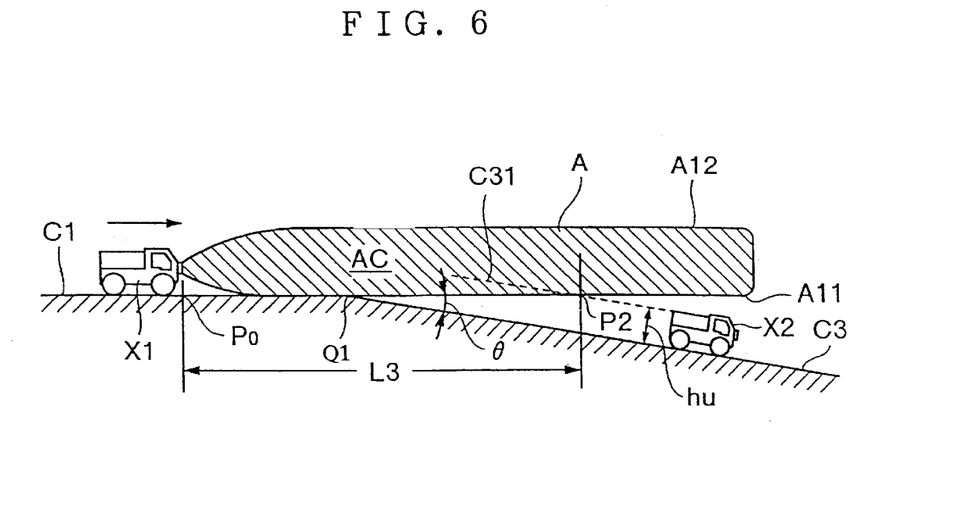
FIG. 6 is a side elevational view of a downhill road and a vehicle traveling on the downhill road, according to an embodiment of the present invention.

The small step S3C is as follows. As shown in FIG. 6, the vehicle X1 approaches a starting point Q1 of a downhill road C3 from the straight road C1. At this time, the computing element 71 computes a virtual downhill road C31 translated parallel upward from the downhill road C3 by the predetermined height hu. The computing element 71 further computes distance L3 to an intersection point P2, of an outer edge A11, on the lower side of the detection limit area A, of the object detecting means 1, and the virtual downhill road C31, and limits the detection distance L by the distance L3. It should be mentioned that the aforementioned processing is performed in the same way when the vehicle X1 approaches an end point of an uphill road, for example, as the straight road C1 is like an uphill road by rotating FIG. 6 counterclockwise.

Figure 7:
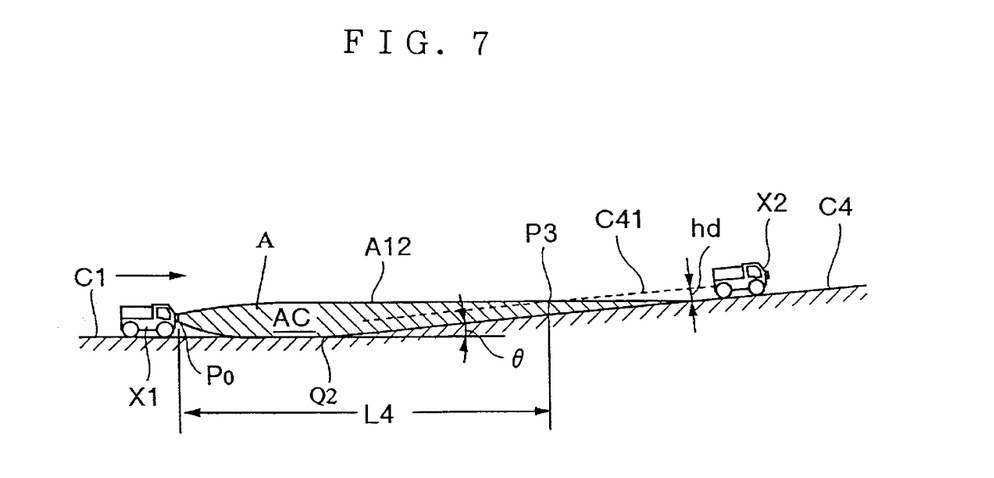
FIG. 7 is a side elevational view of an uphill road and a vehicle traveling on the uphill road, according to an embodiment of the present invention.

The small step S3D is as follows. As shown in FIG. 7, the vehicle X1 approaches a starting point Q2 of an uphill road C4 from the straight road C1. At this time, the computing element 71 computes a virtual uphill road C41, translated parallel upward from the uphill road C4, by the predetermined height hd, and in addition computes distance L4 to an intersection point P3, of an upper surface outer edge A12, of the detection limit area A, of the object detecting means 1, and the virtual uphill road C41, and limits the detection distance L by the distance L4. It should be mentioned that the aforementioned processing is performed in the same way when the vehicle X1 approaches an end point of a downhill road, for example, as the straight road C1 is like a downhill road by rotating FIG. 7 clockwise.

A step S4 is as follows. The computing element 71 compares the above four distances L1 to L4, obtained in the aforementioned steps S3A to S3D, and makes the shortest distance of the above four distances the limited detection distance Ln. Incidentally, when only one step, for example only step S3A, out of the aforementioned steps S3A to S3d appears, the distance L1 is made equal to the limited detection distance Ln.

A step S5 is as follows. The computing element 71 computes the speed at the start of braking Vmax with the limited detection distance Ln (the shortest value of L1 to L4) as the braking stop distance La, stored in the storage means 74. The speed at the start of braking Vmax is read out with a function (Vmax f(La)), if the storage means 74 stores the speed at the start of braking Vmax of every braking stop distance La with a function (Vmax=f(La)), and read out with a matrix, if the storage means stores the same with a matrix (Vmax: La), respectively. Incidentally, in the present invention, both "to compute" and "to read out" mean "to compute".

A step S6 is as follows. The computing element 71 operates the speed control actuator 4 so that the speed at the start of braking Vmax will be the upper limit of the actual speed Va.

According to the example of the operation program of the aforementioned embodiment, the following operational effects can be obtained.

First, the detection distance L from the object detecting means 1 is limited by the particular detection limit area A of the object detecting means 1, and the predetermined course Co, as seen from the current position Po of the vehicle X1. Namely, the limited detection distance Ln is the effective detection distance for vehicle X1. Moreover, the speed at the start of braking Vmax is computed with the limited detection distance Ln as the braking stop distance La. Here, the speed at the start of braking Vmax is set for speed at which the vehicle X1 can stop within the braking stop distance La when the vehicle X1 is suddenly braked while traveling. The speed control actuator 4 is operated to control the actual speed Va so as to make the aforementioned speed at the start of braking Vmax the upper limit. Accordingly, the object detecting means 1 of the vehicle X1 never collides or interferes with a detected object. In other words, the vehicle X1 can travel at the speed at the start of braking Vmax, that is, the maximum speed which can prevent collision or interference. Thus, productivity as well as safety operation of the vehicle X1 can be considerably and certainly improved. Incidentally, the object detecting means 1 also detects objects outside the predetermined course Co, and the speed controller 7 also has operational effects of excepting such objects outside the predetermined course Co by limiting the detection distance L.

According to the aforementioned small steps S3A to S3D as the examples of limiting the detection distance L, the following operational effects can be obtained, respectively.

As shown in FIG. 3 and FIG. 4, the small step S3A operates when the predetermined course Co is the straight course C1. Specifically, the speed controller 7 moves the vehicle X1 at the actual speed Va, below the speed at the start of braking Vmax, which corresponds to the farthest distance Lmax (which is the distance L1 and the same as the longest distance in the detection limit area A, as described above) from the current position Po, within the detection distance L from the object detecting means 1. The speed at the start of braking Vmax at this time is substantially the fastest speed of the speed at the start of braking Vmax stored by the storage means 74. Hence, collision or interference of the vehicle X1 and a detected object can be prevented, and moreover the vehicle X1 can travel at a high speed, which leads to a considerable improvement in productivity.

As shown in FIG. 5, the small step S3B operates when the predetermined course Co is the curve C2. Specifically, the speed controller 7 moves the vehicle X1 at the actual speed Va, below the speed at the start of braking Vmax, which corresponds to the distance L2, to the nearest intersection point P1 from the current position Po, of intersection points P1 and P11, of the outer edge A1, of the detection limit area A, and the outer edge C21 of the curve C2. Thus, the vehicle X1 never travels beyond the curve C2. In other words, even when the vehicle X1 travels at the speed at the start of braking Vmax, the vehicle X1 can travel at high speed without jumping over the curve C2. Incidentally, as the curvature of the curve C2 changes, the distance L2 is updated in accordance with the change, so that the speed at the start of braking Vmax is also updated.

As shown in FIG. 6, the small step S3C operates when the starting point Q1 of the downhill road C3 or the end point (not shown) of the uphill road C4 exists on the predetermined course Co ahead of the vehicle X1. Specifically, the speed controller 7 moves the vehicle X1 at the actual speed Va below the speed at the start of braking Vmax which corresponds to the distance L3 to the intersection point P2, of the virtual downhill road C31, which is provided by translating parallel to the downhill road C3 ahead of the starting point Q1, or the straight road C1, or the downhill road C3, ahead of the end point (not shown) of the downhill road C3, upward by the predetermined height hu, and the outer edge A11 on the lower side of the detection limit area A. Here, as shown in FIG. 6, the predetermined height hu is nearly the height of, for example, an upper end of the rear surface of another vehicle X2 which exists ahead in the traveling direction of the vehicle X1. When the starting point Q1 of the downhill road C3 or the end point of the uphill road C4 exists on the predetermined course Co ahead of the vehicle X1, another vehicle X2 sometimes exists in an area at a short distance from but outside the detection limit area A of the object detecting means 1 of the vehicle X1. If another vehicle X2 like this is traveling at low speed or stopping, the object detecting means 1 of the vehicle X1 detects another vehicle X2 suddenly and immediately in front of the vehicle X2. At this time, if the vehicle X1 is traveling at high speed, there is a risk that the vehicle X1 will collide or interfere with another vehicle X2, even when the vehicle X1 is immediately braked. In the small step S3C, however, the use of the predetermined height hu makes it possible to secure the limited detection distance L3 farther beyond the starting point Q1 by the predetermined height hu, as shown in FIG. 6. Thus, the vehicle X1 can travel at a speed, within the limits of the fast speed at the start of braking Vmax, while preventing a collision or interference with another vehicle X2 existing on the road ahead of the starting point Q1 of the downhill road C3 or the end point of the uphill road C4. Incidentally, the predetermined height hu may be a fixed height of a reflector, if the reflector is attached to the rear surface of another vehicle X2. In such a case, the higher the fixed height hu, the faster the speed at which the start of braking Vmax can be made. It should be mentioned that the reflector is used for preventing a decline in detection accuracy of the object detecting means 1 due to a shape of the rear surface of another vehicle X2, weather (such as snow or rain), and the like.

As shown in FIG. 7, the small step S3D operates when the starting point Q2 of the uphill road C4 or the end point (not shown) of the downhill road C3 exists on the predetermined course Co ahead of the vehicle X1. Specifically, the speed controller 7 moves the vehicle X1 at the actual speed Va below the speed at the start of braking Vmax, which corresponds to the distance L4 to the intersection point P3 of the virtual uphill road C41, which is provided by translating parallel to a road surface of the course ahead of the starting point Q2, of the uphill road C4, upward by the predetermined height hd, and the upper surface outer edge A12, of the detection limit area A. Here, as shown in FIG. 7, the predetermined height hd is the height to the body of another vehicle X2 which exists ahead in the traveling direction of the vehicle X1. For example, when the uphill road C4 exists in front of the vehicle X1, and moreover another vehicle X2 fixed with tires exists on the uphill road C4, the detection distance L becomes shorter according to the height of space between the uphill road C4 and a lower portion of the body of the vehicle X2, caused by fixing the tires (which corresponds to the predetermined height hd). This is because the vehicle X2 is hard to detect as an object, since a the tires is low in intensity level. The detection distance L is determined by the relationship between a gradient 0 of the uphill road C4 and the predetermined height hd. When the vehicle X1 is traveling at high speed under these circumstances, there is a risk that the vehicle X1 will collide or interfere with another vehicle X2 even when the vehicle X1 is immediately braked. The small step S3D in this embodiment is provided to solve the above problem. In the small step S3D, the use of the predetermined height hd makes it possible to secure the limited detection distance L4, which is longer by length corresponding to the aforementioned height of space as shown in FIG. 7. Thus, the vehicle X1 can travel at speed below the speed at the start of braking Vmax while preventing collision or interference with another vehicle X2. Incidentally, the predetermined height hd depends on the height of the base of the body of vehicle X2, but if a reflector is attached to the rear surface of vehicle X2, the predetermined height hd may be the fixed height of the reflector. In such a case, the lower the fixed height, the faster the speed at which the start of braking Vmax can be made.

Other embodiments (A) to (D) will now be enumerated.

(A) In the aforementioned embodiment, the storage means 74 in this speed controller 7 stores the detection limit area A of the object detecting means 1. Although the explanation has not been given so far, the object detecting means 1 also includes a storage element or a computing element to perform object detection processing. Thus, the detection limit area A can be also stored in the storage element of the object detecting means 1.

(B) The storage means 74 stores the speed at the start of braking Vmax of every braking stop distance La. The above speed, however, changes depending on a load W, an angle $\theta$ of a slope, coefficient of friction $\mu$ of a road surface based on a rainfall or a snowfall, or the like. Specifically, if only the aforementioned speed at the start of braking Vmax of every braking stop distance La is stored, there is a risk that the vehicle X1 will collide or interfere with a detected object. Hence, in the example of the operation program in FIG. 2, the computing element 71 receives correction factors ki and k2 from the external input means 6 and the like as illustrated in steps S7 and S71. As shown in the steps S7 and S71, the speed at the start of braking Vmax computed in the step S5 is corrected with these correction factors k (k1 and/or k2). Incidentally, this correction (the steps S7 and S71) can be also performed between the step S1 and the step S2. Here, a corrective operation can be simply performed by storing a simple empirical formula "k·Vmax" based on actually surveyed data. On the assumption that the downhill road C3 or the uphill road C4 is a steep gradient θ, a gradient gauge or the like is attached on a vehicle and detected data therefrom is inputted as a correction factor k3 to the computing element 71, to correct the speed at the start of braking Vmax similarly to the aforementioned correction factors k1 and k2. In this case, the gradient gauge or the like is regarded as the external input means 6. The correction factor k can be further set, besides the aforementioned correction factors k1 to k3, in consideration of wind direction, wind force, or the like. As described above, the correction of the speed at the start of braking Vmax of every braking stop distance La with the correction factor k enables the use of a more precise speed at the start of braking k·Vmax. A transmitting/receiving antenna of the object detecting means 1 is not only a stationary type, as described in the aforementioned embodiment, but also applicable to the case where the antenna sways' laterally or vertically. The transmitting/receiving antenna is swayed in the most suitable direction, for example, to follow a steering direction, and thereafter the aforementioned processing may be performed in relation to the obtained detection limit area A. Moreover, an angle of rotation, to make the speed at the start of braking Vmax the maximum, may be also found.

(C) The course storage means 2 stores speed data in each section, in addition to distance, Gradients, or the like, concerning a route, the straight road C1, the curve C2, the downhill road C3 and the uphill road C4, as shape data on the predetermined course Co, and the speed controller 7 stores a speed control program. This is an embodiment of a self-traveling vehicle in which the speed controller 7 receives information on the current position Po of the vehicle X1, from the current position defining means 3, and speed data from the course storage means 2, and moves the vehicle X1 on the predetermined course while speed-controlling it under the speed control program. In this embodiment, as shown in steps S8 and S81 of the example of the operation program in FIG. 2, the computing element 71 updates speed data stored in the course storage means 2 with the speed at the start of braking Vmax, obtained in the step S6, or the speed at the start of braking k Vmax, obtained in the steps S7 to S71. The update of speed data in the speed control program described above enables the achievement of safer and higher productive unmanned traveling.

Figure 2:
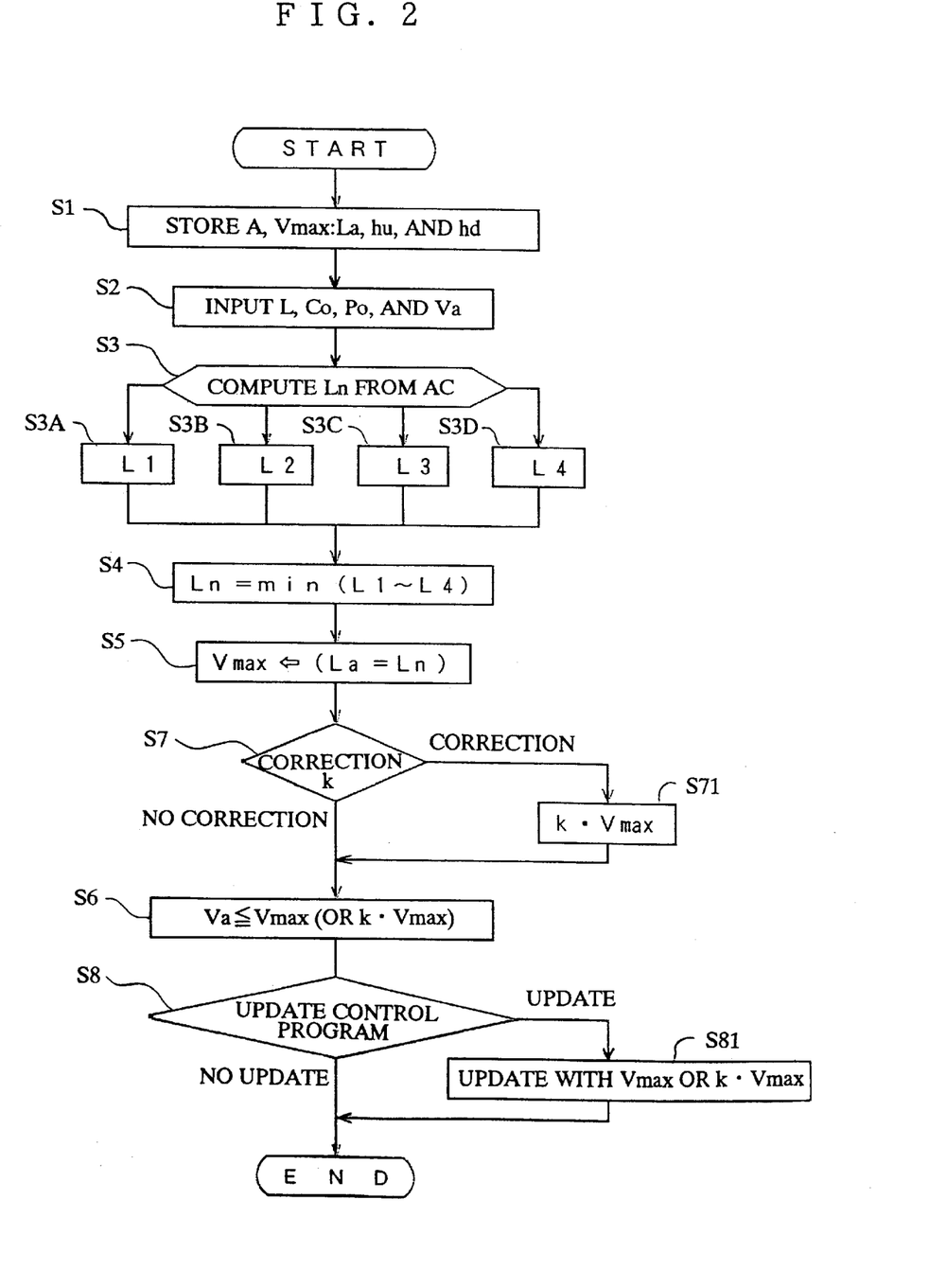
FIG. 2 is a flowchart of an embodiment of the present invention.

(D) The information means 5, which is not illustrated in the example of the operation program in FIG. 2, sounds an alarm with an alarm unit, instantaneously blinks a flasher unit on and off, or displays updated results with a CRT or the like when the object detecting means 1 detects an object, the speed data stored in the course storage means 2 is updated with the speed at the start of braking Vmax or k·Vmax, or the like, for example. As a result, operators and the like can know object detection, update of speed data, update history, or the like.

After each operation program in the aforementioned embodiments is completed, the vehicle X1 needs to conduct ordinary operation based on the object detecting means 1, which is not illustrated. Ordinary operation, which has not been explained so far, is conventional operation. If the vehicle X1 is a manually operated vehicle, for example, the object detecting means 1 causes an alarm unit to sound an alarm to inform an operator of object detection when detecting an object. If the vehicle X1 is an unmanned vehicle and approaches a detected object, the speed controller 7 is required to input an operation command to the speed control actuator 4 to further reduce speed. At that time, the speed Va is limited below the speed at the start of braking Vmax or the correction speed thereof k Vmax, which can prevent the vehicle X1 from colliding or interfering with the detected object in the aforementioned embodiments so that the vehicle X1 can be speed-controlled.

What is claimed:

1. A speed controller for a self-traveling vehicle comprising:

an object detecting means for detecting an object, in a traveling direction of said vehicle, and a distance to said object;

a course storage means for storing a predetermined course in a coordinate system;

a current position defining means for receiving coordinate information on said predetermined course from said course storage means and defining a current position of said vehicle on said predetermined course; and a speed control actuator, wherein said vehicle is an unmanned vehicle;

wherein a detection limit area of said object detecting means is stored in advance, and speeds at the start of braking for respective braking stop distances are stored in advance;

wherein information on the detected distance from said object detecting means, information on the predetermined course from said course storage means, and information on the current position from said current position defining means are received respectively;

wherein the detection distance from said object detecting means to the object is a limited detection distance, which is limited by the detection limit area from the current position and the predetermined course from the current position;

wherein the speed at the start of braking is computed with the limited detection distance as the braking stop distance;

wherein actual vehicle speed is controlled by operating said speed control actuator to make the speed at the start of braking the upper speed limit; and wherein said speed controller stores a speed control program corresponding to said predetermined course and said vehicle travels on said predetermined course while being speed-controlled by said speed control program.

2. A speed controller for the self-traveling vehicle, according to claim 1, wherein the limited detection distance is a distance between a nearest intersection point from the current position, out of intersection points of an outer edge of the detection limit area and an outer edge of the predetermined course, as seen from above, and the current position.

3. A speed controller for the self-traveling vehicle, according to claim 1, wherein a point is defined at a location where a height from a lower surface of the outer edge of the detection limit area to an upper surface of the predetermined course, as seen from a cross direction, is a predetermined height, and wherein a distance from the current position to the defined point is made the limited detection distance.

4. A speed controller for the self-traveling vehicle, according to claim 1, wherein a point is defined at a location where height from an upper surface of the outer edge of the detection limit area to an upper surface of the predetermined course, as seen from a cross direction, is a predetermined height, and wherein a distance from the current position to the defined point is made the limited detection distance.

5. A speed controller for the self-traveling vehicle, according to claim 1, wherein said speed controller updates information on vehicle speed at each position on the predetermined course in the speed control program to make the speed at the start of braking, computed by said speed controller, the upper speed limit.

6. A speed controller for a self-traveling vehicle, according to claim 1, further comprising:
   a speed detector for detecting an actual speed of the vehicle;
   a load gauge for detecting a state of a load on a load-carrying platform of the vehicle; and
   storage means for storing parameters comprising a speed at the start of braking, a braking stop distance, and predetermined heights.

7. A speed controller for a self-traveling vehicle, according to claim 1, further comprising external input means for inputting correction factors to the speed controller.

8. A speed controller for a self-traveling vehicle, according to claim 1, further comprising information means for indicating the status of the speed controller.

9. A method of controlling a speed of an unmanned self-traveling vehicle, comprising the steps of:
   determining a detection limit area;
   determining a speed at a start of braking of said vehicle;
   determining predetermined heights of said vehicle;
   detecting a distance from said vehicle to an object;
   determining a predetermined course of travel for said vehicle;
   detecting a current position of said vehicle;
   determining an actual speed of said vehicle;
   determining a conjunction of said detection limit area and said predetermined course of travel;
   determining a shortest distance from a plurality of farthest distances from said current position to points within said conjunction of said detection limit area and said predetermined course of travel;
   defining a limited detection distance as said shortest distance;
   determining a speed at a start of braking based on said limited detection distance;
   storing a speed control program corresponding to said predetermined course of travel; and
   controlling said actual speed of said vehicle according to said speed control program so that said actual speed does not exceed said speed at a start of braking.

10. A method of controlling a speed of an unmanned self-traveling vehicle, comprising the steps of:
   determining a detection limit area and a speed at a start of braking corresponding to the detection limit area;
   detecting an object in a traveling direction of said self-traveling vehicle and a distance to said object;
   storing a predetermined course as coordinate information;
   determining a current position of said self-traveling vehicle on said predetermined course;
   determining a limited detection distance which is said distance to said object limited by said detection limit area from said current position of said self-traveling vehicle;
   determining a speed at a start of braking with said limited detection distance being a braking stop distance;
   storing a speed control program corresponding to said predetermined course; and
   controlling said speed of said self-traveling vehicle according to said speed control program while said self-traveling vehicle is traveling along said predetermined course so that said speed at said start of braking is an upper speed limit.

* * * * *